(12) United States Patent
Wong

(10) Patent No.: US 8,708,262 B2
(45) Date of Patent: Apr. 29, 2014

(54) PORTABLE FOOD BLENDER

(76) Inventor: Yan Kwong Wong, Kowloon (HK)

(*) Notice: Subject to any disclaimer, the term of this patent is extended or adjusted under 35 U.S.C. 154(b) by 238 days.

(21) Appl. No.: 12/679,306

(22) PCT Filed: Apr. 1, 2009

(86) PCT No.: PCT/CN2009/071121
§ 371 (c)(1),
(2), (4) Date: Mar. 20, 2010

(87) PCT Pub. No.: WO2009/129714
PCT Pub. Date: Oct. 29, 2009

(65) Prior Publication Data
US 2011/0180643 A1    Jul. 28, 2011

(30) Foreign Application Priority Data
Apr. 22, 2008 (CN) .................. 2008 2 0093531 U

(51) Int. Cl.
*A47J 42/40* (2006.01)
(52) U.S. Cl.
USPC ........................................ 241/169.1
(58) Field of Classification Search
USPC ............................. 241/169.1, 168
See application file for complete search history.

(56) References Cited

U.S. PATENT DOCUMENTS

| | | | | |
|---|---|---|---|---|
| 4,960,246 A * | 10/1990 | Fohrman | .................... | 241/169.1 |
| 5,490,454 A * | 2/1996 | Ancona et al. | .................. | 99/510 |
| 5,533,683 A * | 7/1996 | Fay et al. | ...................... | 241/169 |
| 6,616,075 B1 * | 9/2003 | Millerd | .......................... | 241/168 |
| 6,793,168 B1 * | 9/2004 | Pedersen | ..................... | 241/169.1 |
| 7,059,553 B2 * | 6/2006 | Mueller | .................... | 241/199.12 |
| 7,367,519 B2 * | 5/2008 | de Groote et al. | .......... | 241/169.1 |
| 7,422,169 B2 * | 9/2008 | Mueller | ......................... | 241/168 |
| 7,669,793 B2 * | 3/2010 | So et al. | ...................... | 241/169.1 |
| 7,762,487 B2 * | 7/2010 | Cheung | ....................... | 241/169.1 |
| 2004/0159727 A1 * | 8/2004 | Mueller | ...................... | 241/169.1 |
| 2006/0208115 A1 * | 9/2006 | Mueller | ...................... | 241/169.1 |
| 2009/0045274 A1 * | 2/2009 | So et al. | ...................... | 241/169.1 |
| 2009/0078807 A1 * | 3/2009 | Tang | ........................... | 241/169.1 |
| 2009/0134256 A1 * | 5/2009 | Rice | ............................ | 241/169.1 |
| 2009/0178580 A1 * | 7/2009 | Herren | ............................ | 99/510 |

* cited by examiner

*Primary Examiner* — Faye Francis
(74) *Attorney, Agent, or Firm* — Howard C. Miskin; Gloria Tsui-Yip

(57) ABSTRACT

This utility patent is a portable food blender. It includes a food container, a blade set with cutting blades that is set in the said container and can spin, and a container cover set that is on top of the said container and cannot rotate relative to the container. The said container cover set has an upper surface and a lower surface. It also includes a pivot and driving unit. The said pivot intrudes out from the said container cover set's upper side. When the pivot rotates against the said container cover set, it drives the driving unit to make the said blade set spin. The said pivot is inside in the side of the said container cover set and is mounted to the upper surface. The said driving unit is mounted on the said container cover set's lower surface. The portable food container of this utility patent has the following benefits: The structure of the item is relatively simple. It is easy to manufacture. It is easy to use. And it can achieve better result when processing food.

9 Claims, 4 Drawing Sheets

PORTABLE FOOD BLENDER

This application is a U.S. national stage of PCT application PCT/CN2009/071121, filed on Apr. 1, 2009 which claims priority of Chinese application No. 200820093531.X, filed on Apr. 22, 2008.

BACKGROUND OF THE INVENTION

1. Field of the Invention

This utility patent is a kitchen apparatus. Specifically, it is a portable food blender.

2. Description of Prior Art

Food blenders are widely used in the kitchen. People use food blenders to smash food, especially to cut fruit and vegetables to small desirable pieces so that people can do further processing or simply eat. Currently, there are many types of food processors on the market. Most products use manually rotating pivots to drive shafts with blade in the end, so that the blades can spin and achieve food blending. However, these food processors are usually pretty complex in structure. When a larger driving ratio is required, the pivot that is on the center of the cover is usually very large. Thus, the manufacturing of the cover is not convenient. Besides, the resistance imposed on the food is not strong enough. Thus, the blending effect is limited.

SUMMARY OF THE INVENTION

The problem that this utility patent application aims to resolve is: targeting at the complexity in structure, the inconvenience in manufacturing, and the undesirable result of food processing, it provides a portable food blender that is simple in structure, easy to manufacture, and better in blending food.

The technical solution of this utility patent application is: to invent a portable food blender which includes a food container, a blade set with cutting blades that is set in the said container and can spin, and a container cover set that is on top of the said container and cannot rotate relative to the container. The said container cover set has an upper surface and a lower surface. It also includes a pivot and driving unit. The said pivot intrudes out from the said container cover set's upper side. When the pivot rotates against the said container cover set, it drives the driving unit to make the said blade set spin. The unique character is that the said pivot is inside in the side of the said container cover set and is mounted to the upper surface. The said driving unit is mounted on the said container cover set's lower surface.

In the portable food blender of this utility patent application, there are threads in the round inner surface of the said pivot. The said driving unit includes a driving gear, a spinning gear, and a spinning shaft. The said driving gear is mounted on the lower surface of the said container cover set, fitting into both the said threads and the spinning gear. The spinning gear is mounted on the said spinning shaft. The said spinning shaft extends outside the lower surface of the said container cover set through the center hole of the said lower surface of the said container cover set. The said spinning shaft is thus mounted to the said blade set.

In the portable food blender of this utility patent application, there are at least one first bulging thread inside the inner surface of the said container, extending from the top of the container to its bottom, to increase the resistance between the blades and the food.

In the portable food blender of this utility patent application, there are two notches on the outer surface of the said container, to help the user to hold the food blender while using it.

In the portable food blender of this utility patent application, there are four first bulging threads on the inner surface of the said container. These said first bulging threads are grouped into two groups, and are symmetrically positioned based on the said notch.

In the portable food blender of this utility patent application, there is a first positioning column in the center inside of the said pivot. The end of the said first positioning column is split into several elastic strips by several axial cuttings. In the upper surface of the said container cover set, there is a notch that fits into the said pivot and a first positioning hole that fits into the said first positioning column. The said pivot is mounted to the said notch on the upper surface of the said container cover set by matching the elastic strips of the first positioning column into the said first positioning hole. There is a second positioning column on the lower surface of the said container cover set. The said second positioning column passes through the central hole of the said driving gear to mount the said driving gear.

In the portable food blender of this utility patent application, there is a second hole in the center of the lower surface of the said container cover set. The diameter of the said second hole on the said container side is larger than the diameter on the other side. The said spinning shaft has upper part and lower part that are assembled together. The lower part is a hexagon column. The upper part is a cylinder that has a diameter that fits into the diameter of the second hole on the container side. The cylinder also has a hexagon shaped second notch. The said spinning gear has a third positioning column bulging towards the container and fitting in the said second notch. The said spinning shaft, spinning gear, and the lower surface of the said container cover set are fixed together using a screw bolt through the said third positioning column and the said second notch.

In the portable food blender of this utility patent application, the said blade set has a hexagon central axis and at least one fitting cap which is hollow, has the shape of the said central axis and fits into the said central axis. At the bottom of the said central axis there is a step extension which is larger than the axis. To one side of said blade set there is a fitting hole that has the same shape of the said central axis and can be fixed to the said central axis by the said fitting cap between the step extension of the said central axis and the said fitting cap. The said central axis is mounted to the said fitting cap via the screw bolt that passes through the said fitting cap and fixed to the said central axis.

In the portable food blender of this utility patent application, the said blade set has first blade and second blade. The said fitting cap has first fitting cap and second fitting cap. The said first blade is fixed between the first fitting cap and the said step extension. The said second blade is fixed between the first fitting cap and the second fitting cap. The said first blade and second blade are mounted on the opposite positions of the said central axis.

In the portable food blender of this utility patent application, there is a fourth positioning column on the center of the bottom of the said container, pointing towards the said container cover set. In the center of the bottom of the said central axis there is a third notch. The said fourth positioning column and said third notch matches each other so that the said central axis will not move when spinning.

The portable food blender of this utility patent application has the following benefits: Since the pivot has a different center than the container cover set, when using a larger driving ratio, the unit has a simpler structure and is easier to manufacture. The notch outside the container makes the portable food blender easier to handle. The first bulging thread increases the resistance between the food and the blades, making it easier to blend the food.

BACKGROUND OF THE INVENTION

Figure 1:
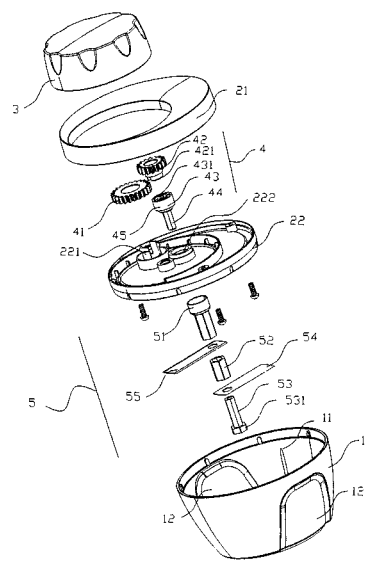
FIG. 1 is the structural illustration of the portable food blender.

As illustrated in FIG. 1, the portable food blender of this utility patent includes container 1, container cover set 2 which includes container cover set upper surface 22 and container cover set lower surface 21 and the driving unit 4 that is between them, pivot 3 that is mounted on the container cover set upper surface 22, and blade set 5. On the inner surface of container 1, there are 4 first bulging threads 11 that follow the axial direction of the container 1 (i.e., the said first bulging thread runs from the top of the container 1 to its bottom on the inner surface). Said first bulging thread 11 is used to increase the resistance between the blades and the food when the portable food blender processes food, therefore to improve the effectiveness of cutting the food. At the same time, on the exterior of container 1, there are two notches 12. These two notches are for the users to hold when using this portable food blender, so that the portable food blender can be securely controlled, and the user can easily rotate the said pivot 3. Besides, these two notches can also help the user to twist the pivot back and forth, so to increase the speed of the food blender. In this implementation, since these two said notches 12 are depressed into the container, and form a bulge on the inner surface of the container 1, they can also increase the resistance of food inside container 1. The said four first bulging threads 11 are grouped into two groups. Each group has two first bulging threads 11. The first bulging threads 11 of each group are positioned symmetrically against each other centered in a botch 12. That means on both sides of each notch 12 there is a first bulging threads 11.

Figure 2:
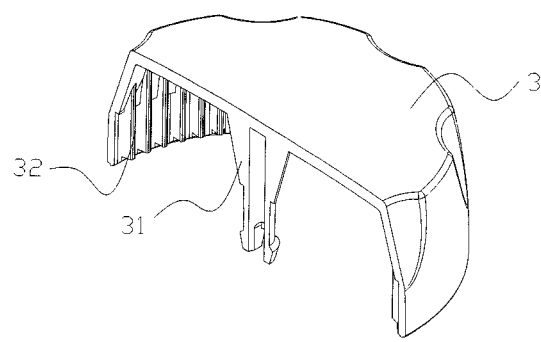
FIG. 2 is the section view of the pivot of the portable food blender.
Figure 3:
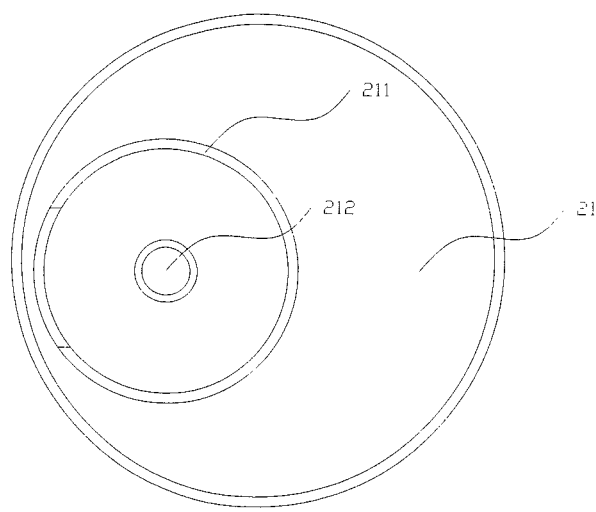
FIG. 3 is the top view of the container cover set of the portable food blender.

In this implementation, there is a first positioning column 31 in the center of pivot 3, and extending to its inside. The said first positioning column 31 is split into several elastic positioning strips by at least one axial cutting on it. At the end of each elastic positioning strip this is a extension, as shown in FIG. 2. On the container cover set upper surface 22 there is a botch 211 that fits into the said pivot 3 and a first positioning hole 212 that fits into the said first positioning column 31. The said pivot 3 is mounted in the said botch 211 of the container cover set upper surface 22 by matching the said elastic positioning strips in the first positioning column 31 and the said first positioning hole 212, as illustrated in FIG. 3.

There is thread 32 on the inner surface of the said pivot 3, as illustrated in FIG. 2. The said driving unit 4 includes driving gear 41, spinning gear 42, and spinning shaft 45. There is a positioning hole at the center of the driving gear 41. The driving gear 41 is mounted on the second positioning column 221 on the said lower surface 21 of the said container cover set 2 through the positioning hole, fitting into the said thread and the spinning gear 42. The said spinning gear 42 is fixed on the said spinning shaft 45. The said spinning shaft 45 goes through the hold in the center of the said lower surface 21 of the said container cover set 2 and is fixed to the said blade set 5.

There is a second positioning hole 222 at the center of the said lower surface 21 of the said container cover set 2. The diameter of the said second hole 222 on the container 1's side is larger than the diameter on the other side. The said spinning shaft 45 has a upper part and a lower part that are fixed together. The lower part is a hexagon column 44. The upper part is a cylinder 43 that matches into the diameter of the said second positioning hole 222 on the container 1's side. The said cylinder 43 also has a hexagon second notch 431. The said driving gear 41 has a third positioning column 421 which outstretches to the said container 1 and matches into the said second notch 431. The said spinning shaft 45, spinning gear 42 and the container cover set upper surface 22 are mounted together using a screw bolt that is fixed to the said third positioning column 421 and second notch 431.

In this implementation, the blade set 5 includes a hexagon column central axis 53, two fitting caps (first fitting cap 52 and second fitting cap 51), first blade 54, and second blade 55. The two fitting caps are hollow. Their center holes have the same shape as the shape of the said central axis 53 and can be fit onto the said central axis 53. At the bottom of the central axis 53 there is a step extension 531 that are larger than the column of the central axis 53. At one side of the first blade 54 and second blade 55 there are fitting holes that has the same shape of said central axis 53. They are mounted to the said central axis 53 by putting these holes in the said central axis 53. The first blade 54 is mounted between the said first fitting cap 52 and the said step extension 531 of said central axis 53. The second blade 55 is mounted between the first fitting cap 52 and the second fitting cap 51. The said first blade 54 and second blade 5 are positioned to the opposite of each other on the said central axis 53. The said second fitting cap 52 is fixed to the said central axis 53 through a screw bolt that runs through the top of the said second fitting cap 52 and connects into the said central axis 53.

Figure 4:
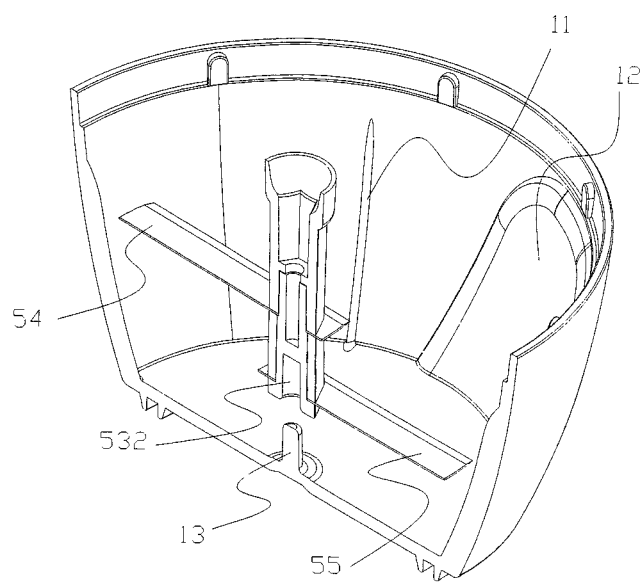
FIG. 4 is the section view of the container and the blade set of the portable food blender.

In this implementation, there is a fourth positioning column 13 at the center of the bottom of the container 1. It outstretches to the said container cover set. There is a third notch 532 at the center of the bottom of said central axis 53. The said fourth positioning column 13 and third notch 532 fit into each other so that the said central axis 53 will not move when spinning. Please refer to FIG. 4 for detailed structure.

In this implementation, when the user places food into the container 1, cover the cover set, and start spinning the pivot 3, the pivot 3 will drive the driving gear 41 through the threads on its inner surface. The driving gear 41 will then drive spinning gear 42 and spinning shaft 45 to spin. Since spinning shaft 45 stretches out of the container cover set lower surface 22 and is fixed to the blade set 5, it will drive the blade set 5 to blend the food inside the container 1. Because of the first bulging thread 11 and notch 12, the resistance for food in the container 1 is increased. At the same time, said fourth positioning column 13 and third notch 532 prevent the blade set 5 from moving around when spinning. Thus the effectiveness of food blending is improved. Notch 12 makes the usage even easier and increases the speed of food blending.

The invention claimed is:

1. A portable food blender comprising a food container, a blade set with cutting blades that is set in the said container and can spin, and a container cover set that is on top of the said container and cannot rotate relative to the container, said container cover set comprising an upper surface and a lower surface, further comprising a pivot and a driving unit, said pivot intrudes out from said container cover set's upper side, wherein when the pivot rotates against the container cover set, it drives the driving unit to make the said blade set spin, wherein the pivot is inside on a side of said container cover set and is mounted to the upper surface, wherein said driving unit is mounted on said container cover set's lower surface, wherein there are threads in the round inner surface of said pivot, said driving unit consists of a driving gear, a spinning gear, and a spinning shaft, said driving gear is mounted on the lower surface of said container cover set, fitting into both said threads and the spinning gear, the spinning gear is mounted on the said spinning shaft, said spinning shaft extends outside the lower surface of the said container cover set through the center hole of the said lower surface of the said container cover set, and wherein said spinning shaft is mounted to the said blade set.

2. The portable food blender of claim 1 having at least one first bulging thread inside the inner surface of the said container, extending from the top of the container to its bottom, to increase the resistance between the blades and the food.

3. The portable food blender of claim 2 wherein there are two notches on the outer surface of the said container, to help the user to hold the food blender while using it.

4. The portable food blender of claim 3 wherein there are four first bulging threads on the inner surface of the said container, wherein said first bulging threads are grouped into two groups and are symmetrically positioned based on the said notch.

5. The portable food blender of claim 4 wherein there is a first positioning column in the center inside of said pivot, the end of the said first positioning column is split into several elastic strips by several axial cuttings wherein in the upper surface of the said container cover set, there is a notch that fits into the said pivot and a first positioning hole that fits into the said first positioning column, said pivot is mounted to the said notch on the upper surface of the said container cover set by matching the elastic strips of the first positioning column into the said first positioning hole, wherein there is a second positioning column on the lower surface of the said container cover set, said second positioning column passes through the central hole of the said driving gear to mount the said driving gear.

6. The portable food blender of claim 5 wherein there is a second hole in the center of the lower surface of the said container cover set, the diameter of the said second hole on the said container side is larger than the diameter on the other side, said spinning shaft has an upper part and lower part that are assembled together, the lower part is a hexagon column, the upper part is a cylinder that has a diameter that fits into the diameter of the second hole on the container side, the cylinder also has a hexagon shaped second notch, said spinning gear has a third positioning column bulging towards the container and fitting in the said second notch, said spinning shaft, spinning gear, and the lower surface of the said container cover set are fixed together using a screw bolt through the said third positioning column and the said second notch.

7. The portable food blender of claim 6 wherein said blade set has a hexagon central axis and at least one fitting cap which is hollow, has the shape of the said central axis and fits into the said central axis, wherein at the bottom of the said central axis there is a step extension which is larger than the axis, to one side of said blade set there is a fitting hole that has the same shape of the said central axis and can be fixed to the said central axis by the said fitting cap between the step extension of the said central axis and the said fitting cap, said central axis is mounted to the said fitting cap via the screw bolt that passes through the said fitting cap and fixed to the said central axis.

8. The portable food blender of claim 7 wherein said blade set has a first blade and second blade, said fitting cap has a first fitting cap and second fitting cap, said first blade is fixed between the first fitting cap and said step extension, said second blade is fixed between the first fitting cap and the second fitting cap and wherein said first blade and second blade are mounted on the opposite positions of the said central axis.

9. The portable food blender of claim 1 wherein there is a fourth positioning column on the center of the bottom of the said container, pointing towards the said container cover set, in the center of the bottom of the said central axis there is a third notch, said fourth positioning column and said third notch matches each other so that the said central axis will not move when spinning.

* * * * *